United States Patent
Hirano

(10) Patent No.: US 6,699,539 B2
(45) Date of Patent: Mar. 2, 2004

(54) RESIN COATING PIPE AND MANUFACTURING METHOD THEREOF, AND FUEL TANK WITH RESIN COATING PIPE

(75) Inventor: Jun Hirano, Iwata (JP)

(73) Assignee: Hit Kougyo Kabushiki Kaisha, Iwata-Gun (JP)

(*) Notice: Subject to any disclaimer, the term of this patent is extended or adjusted under 35 U.S.C. 154(b) by 0 days.

(21) Appl. No.: 09/534,451

(22) Filed: Mar. 24, 2000

(65) Prior Publication Data

US 2003/0148054 A1 Aug. 7, 2003

Related U.S. Application Data

(62) Division of application No. 09/079,695, filed on May 15, 1998, now Pat. No. 6,099,908.

(30) Foreign Application Priority Data

Jun. 20, 1997 (JP) ............................................. 9-164554
Aug. 5, 1997 (JP) ............................................. 9-210871

(51) Int. Cl.⁷ ............................................... B29D 22/00
(52) U.S. Cl. ............................. 428/34.1; 118/DIG. 11; 156/182; 228/71; 285/45; 427/195
(58) Field of Search ................... 285/45, 355; 427/195; 228/71; 156/182; 118/DIG. 11

(56) References Cited

U.S. PATENT DOCUMENTS

| | | | | |
|---|---|---|---|---|
| 1,120,731 A | * | 12/1914 | McIlroy | 427/282 |
| 3,136,651 A | * | 6/1964 | Spessard | 427/195 |
| 3,138,861 A | * | 6/1964 | Gaido | 228/71 |
| 3,434,900 A | * | 3/1969 | Bender | 156/182 |
| 3,535,136 A | * | 10/1970 | Beene | 427/282 |
| 3,675,950 A | * | 7/1972 | Beene | 285/45 |
| 3,784,349 A | * | 1/1974 | Bickham | 425/402 |

FOREIGN PATENT DOCUMENTS

| | | |
|---|---|---|
| GB | 1015302 | 12/1965 |
| JP | 1-177384 | 7/1989 |

* cited by examiner

Primary Examiner—C. Melissa Koslow
Assistant Examiner—Shalie Manlove
(74) Attorney, Agent, or Firm—Oblon, Spivak, McClelland, Maier & Neustadt, P.C.

(57) ABSTRACT

A resin coating pipe wherein a peripheral surface near an end portion of a pipe material (6) is masked through a specified length, and a resin coating layer (7 or 7a) is formed on a rest portion of a surface of the pipe material (6), and the masked portion is made to be an insertion portion (8 or 8a) to be inserted tightly into an inside diameter portion of another fitting member (4), said resin coating layer (7 or 7a) has its end portion being pressurized, and at that portion, a resin connecting portion (17 or 17a) extending along the insertion portion (8 or 8a) and capable of being fitted into an inside diameter portion of another fitting member (4) together with the insertion portion (8 or 8a), is formed.

1 Claim, 5 Drawing Sheets

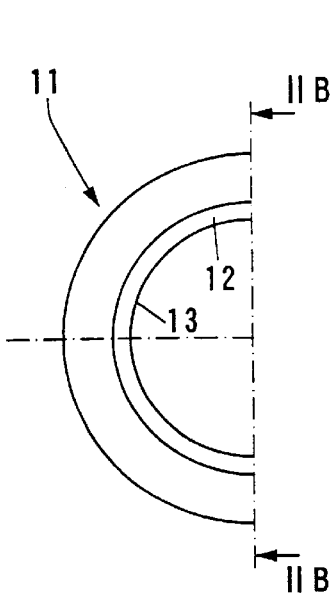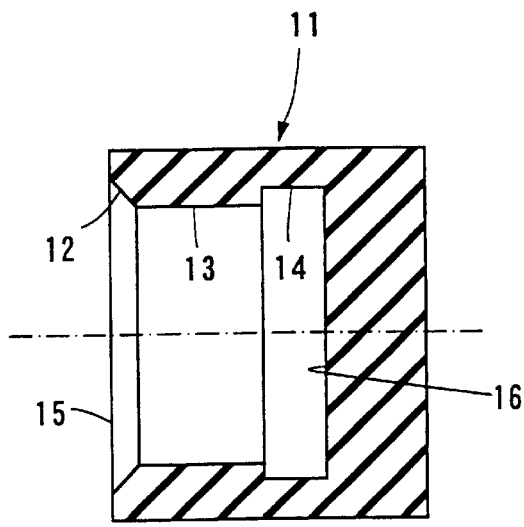
FIG. 2A    FIG. 2B
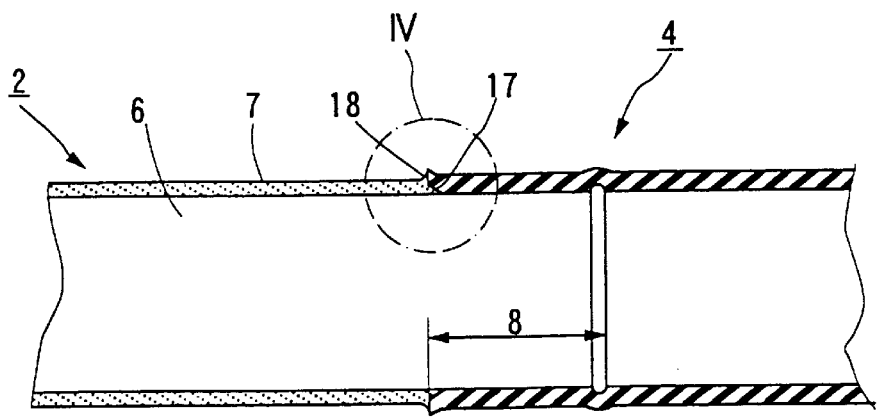
FIG. 3
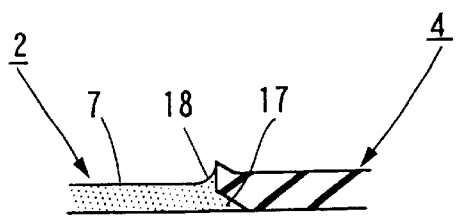
FIG. 4

RESIN COATING PIPE AND MANUFACTURING METHOD THEREOF, AND FUEL TANK WITH RESIN COATING PIPE

This application is a division of application Ser. No. 09/079,695 filed May 15, 1998, now U.S. Pat. No. 6,099,908.

BACKGROUND OF THE INVENTION

The present invention relates to a resin coating pipe mostly used in a fuel filler pipe of an automobile or the like, and a manufacturing method thereof.

FIG. 7 is an perspective view showing a fuel tank and a fuel filler pipe of an automobile. The fuel tank 1 is located at a lower portion of a body of an automobile, and the fuel filler pipe 2 is installed so as to connect the fuel feed portion 3 provided at the body outside plate and the fuel tank 1. In the course of the fuel filler pipe 2, an elastic pipe 4 formed from an elastic material such as a rubber is connected, and by the elasticity of this elastic pipe 4, the error (difference) in the relative position of the fuel feed portion 3 and the fuel tank 1 or the vibration are arranged to be absorbed.

As a material of the fuel filler pipe 2, a material which is excellent in corrosion resistance such as a stainless pipe is preferable, but a stainless pipe is expensive and further, it is scarce of processability such as bending workability, and therefore, commonly, a pipe material made by performing surface treatment such as plating or cationic electro-deposition coating onto the surface of a steel pipe which is cheap and has a good workability, is used as a material of the fuel filler pipe 2. The steel pipe material like this is used such that after it has been subjected to bending processing or the like, a resin coating layer such as a layer of polyethylene is further formed on the surface thereof, and it is made to be a resin coating pipe so that the corrosion resistance thereof may greatly be raised.

As a forming method of a resin coating layer in a resin coating pipe like this, for example, there is such a method that after electrostatically attaching a powdered resin material onto the surface of a pipe material, the pipe material is heated so that the resin material may be melted to form the resin coating layer, or there is such a method that a powdered resin material is sprinkled and attached to a previously heated pipe material, and after that, further, the pipe material is heated to form a resin coating layer.

However, in any above mentioned method, the thickness of the resin coating film is thick (not less than 0.3 mm), and if this thick resin coating layer is applied even to the end potion of the fuel filler pipe 2, the insertion into the elastic pipe 4 becomes difficult, and therefore, it is necessary to mask the peripheral surface near the end portion of the fuel filler pipe 2 through a specified length so that the resin coating layer may not be formed.

Previously, it has been arranged that first, as shown in FIG. 8, the masking member 5 formed approximately in a cylindrical shape (like a cup) from a material such as a heat resistant rubber, is fitted onto the end portion of the pipe material 6, and next, as shown in FIG. 9, a powdered resin material is attached to the rest part of the surface of the pipe material 6 and is subjected to heat treatment to form a resin coating layer 7, and finally, the masking member 5 is removed to complete the fuel filler pipe 2, and as shown in FIG. 7 and FIGS. 9, 10, the portion which has been masked is inserted into the inside diameter portion of the elastic pipe 4 as an insertion portion 8.

However, after the insertion portion 8 of the fuel filler pipe 2 has been inserted into the inside diameter portion of the elastic pipe 4, it often occurs that the elastic pipe 4 is a little shifted in the direction of slipping off from the insertion portion 8 under the influence of the contraction phenomenon of the elastic pipe 4 itself, the running vibration of the vehicle, or the like, and consequently, as shown in FIG. 10, between the end portion of the resin coating layer 7 and the elastic pipe 4, a clearance C is produced. At this portion of the clearance C, the insertion portion 8 where the resin coating layer 7 is not formed (skin of the pipe material 6) is exposed to the outside, and further, water can easily enter into the clearance C, and consequently, the possibility that the fuel filler pipe 2 may suffer corrosion from the portion of the clearance C, has been high.

SUMMARY OF THE INVENTION

The present invention is made to solve this problem, and the object of the invention is to provide a resin coating pipe and manufacturing method thereof in which the occurrence of corrosion at the insertion portion can be prevented, and also to provide a fuel tank having a high durability and reliability against the corrosion at the insertion portion of the fuel filler pipe.

This object can be achieved according to the present invention by providing a resin coating pipe wherein a peripheral surface near an end portion of a pipe material is masked through a specified length, and a resin coating layer is formed on a rest portion of a surface of the pipe material, and the masked portion is made to be an insertion portion to be inserted tightly into an inside diameter portion of another fitting member, said resin coating layer has its end portion being pressurized, and at that portion, a resin connecting portion extending along the insertion portion and capable of being fitted into the inside diameter portion of said another fitting member together with the insertion portion, is formed.

According to the resin coating pipe described above, when the insertion portion of the resin coating pipe is inserted into the inside diameter portion of another fitting member, the resin connecting portion formed to the end portion of the resin coating layer is fitted into the inside diameter portion of another fitting member together with the insertion portion, so that the resin connecting portion may overlap another fitting member. Therefore, even if another fitting member moves a little in the direction of slipping off from the insertion portion of the resin coating pipe, the insertion portion to which the resin coating layer is not formed, is not exposed to the outside, so that the occurrence of corrosion in the insertion portion may be prevented.

Furthermore, the object of the invention can be achieved by providing a manufacturing method of a resin coating pipe which comprises a masking step to fit a masking member onto an end portion of a pipe material, said masking member is formed approximately in a cylindrical shape and has a mold work portion provided in an inside diameter portion on an inlet side thereof, a coating step to form a resin coating layer onto a rest portion of a surface of the pipe material, and a molding step to slide the masking member in the axial direction toward a portion onto which the resin coating layer is formed, so as to pressurize an end portion of the resin coating layer by the mold work portion of the masking member, and to form a resin connecting portion which extends along the insertion potion and is capable of being fitted into the inside diameter portion of another fitting portion together with the insertion portion.

According to the manufacturing method of a resin coating pipe mentioned above, by sliding the masking member toward the resin coating layer formed onto the pipe material, the mold work potion of the masking member is pressed onto the end portion of the resin coating layer, so that the resin connecting portion can uniformly and easily be formed through the whole circumference of the end portion of the resin coating layer, and consequently, the occurrence of corrosion at the insertion portion of the resin coating pipe can surely be prevented.

Moreover, the object of the invention can be achieved by providing a manufacturing method of a resin coating pipe which comprises a masking step to fit a masking member onto an end portion of a pipe material, said masking member is formed approximately in a cylindrical shape from an elastic material and has a press fit portion with an inside diameter to be fitted by pressurizing onto the periphery of the pipe material, a coating step to form a resin coating layer onto a rest portion of a surface of the pipe material, and a molding step to slide the masking member in the axial direction toward a portion onto which the resin coating layer is formed, so as to pressurize an end portion of the resin coating layer by allowing the press fit portion of the masking member run onto the end portion of the resin coating layer, and to form a resin connecting portion which extends along the insertion potion and is capable of being fitted into an inside diameter portion of another fitting portion together with the insertion portion.

According to the manufacturing method of a resin coating pipe mentioned above, by sliding the masking member toward the resin coating layer formed onto the pipe material, the end portion of the resin coating layer is pressurized and extended thinly by the press fit portion of the masking member, so that the resin connecting portion can thinly, uniformly, and easily be formed through the whole circumference of the end portion of the resin coating layer. With this method, since it is unnecessary to form a special shape to the press fit portion of the masking member, the shape of the masking member can be made to be simple.

Also, the object of the invention can be achieved by providing a fuel tank with resin coating pipe comprising a resin coating pipe of this invention as a fuel filler pipe.

According to the fuel tank with a resin coating pipe described above, since a resin coating pipe with a high corrosion resistance at the pipe connecting portion is applied as a fuel filler pipe, the durability and the reliability of the whole fuel tank are improved.

BRIEF DESCRIPTION OF THE DRAWINGS

A preferred embodiment of the present invention will be made more clear through the following descriptions with reference to the accompanying drawings, in which:

FIG. 2A is a front view of the masking member, and FIG. 2B is a vertical cross-sectional view of the masking member shown by the arrow IIB—IIB in FIG. 2A;

FIG. 3 is a figure showing the state where the insertion portion of the fuel filler pipe is inserted into the elastic pipe;

FIG. 4 is an enlarged figure of the portion IV in FIG. 3;

DETAILED DESCRIPTION OF THE PREFERRED EMBODIMENTS

Figure 1A:
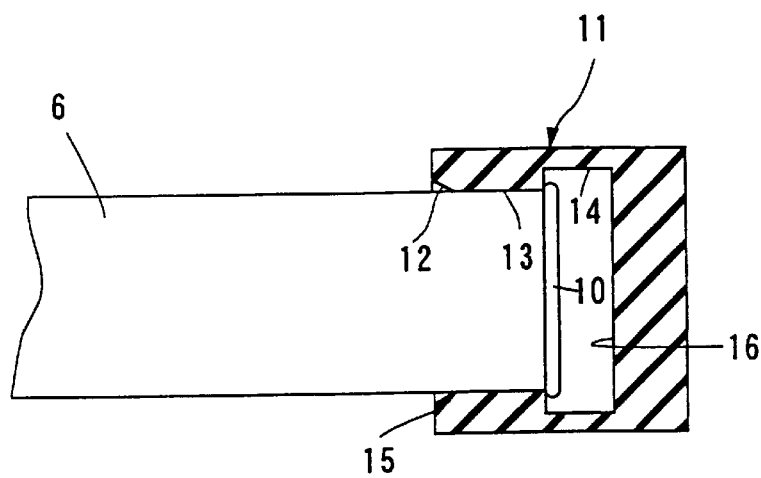
FIGS. 1A to 1C shows a first embodiment of the present invention, and 1A is a figure showing the masking step, 1B is a figure showing the coating step, and 1C is a figure showing the molding step.
Figure 1B:
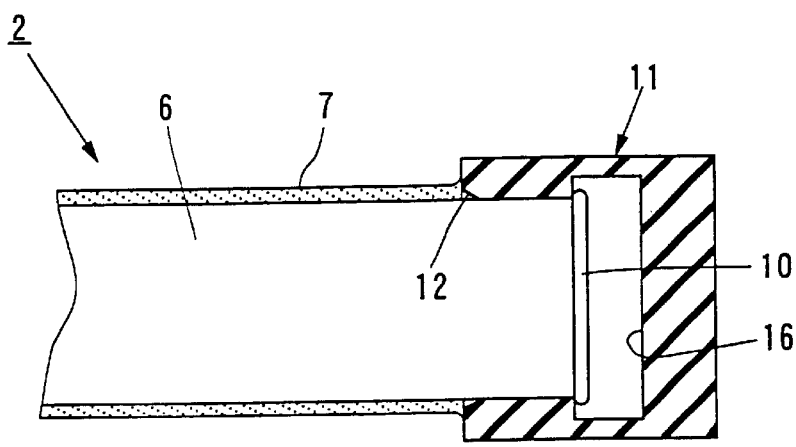
Figure 1C:
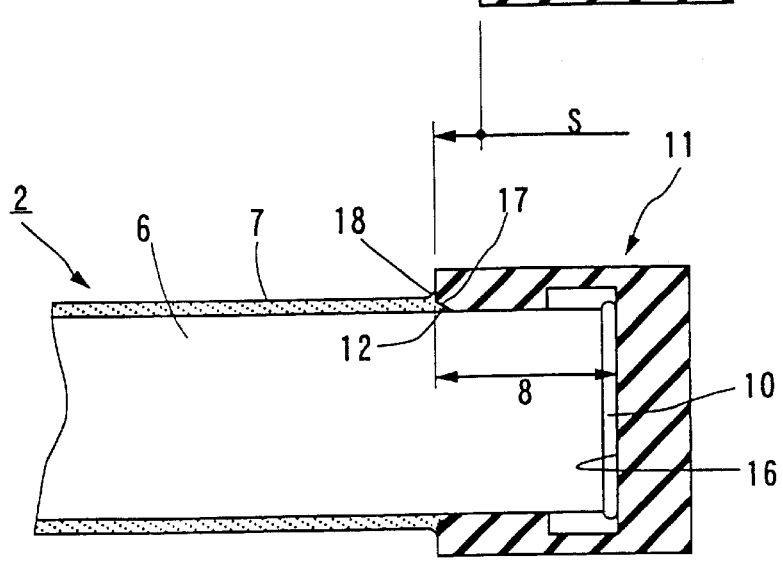
Figure 7:
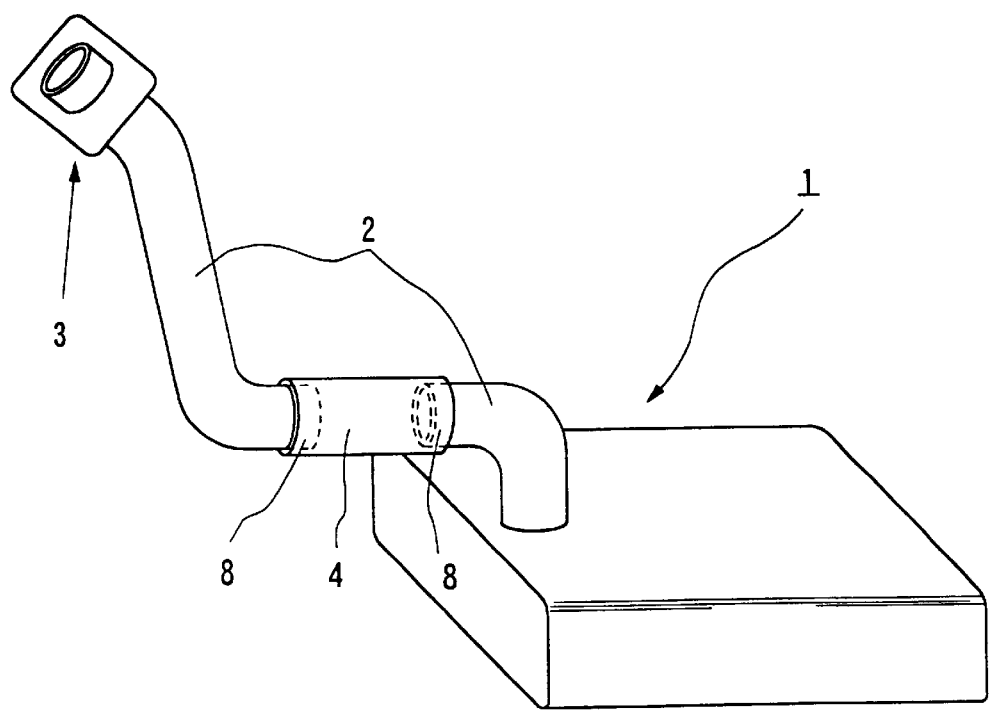
FIG. 7 is an perspective view showing a fuel tank and a fuel filler pipe of an automobile.
Figure 8:
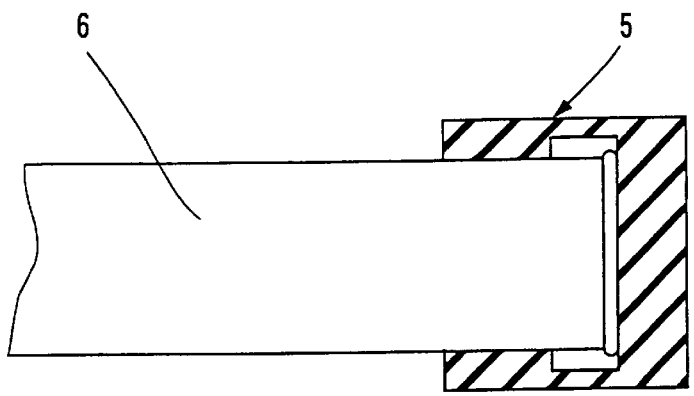
FIG. 8 is a figure showing the state where in prior art, the masking member is fitted onto the end portion of the pipe material.
Figure 9:
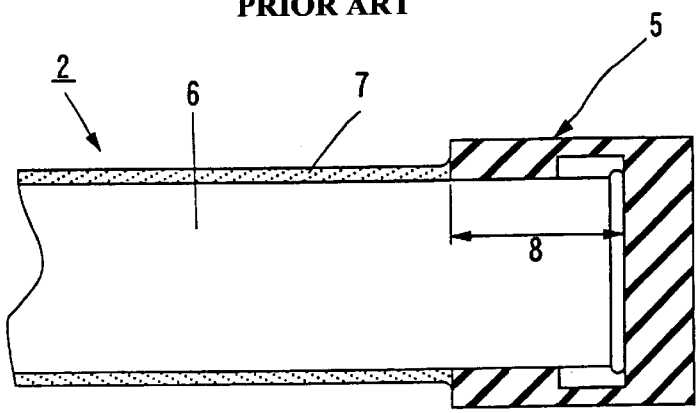
FIG. 9 is a figure showing the state where in prior art, the resin coating layer is formed onto the rest portion of the surface of the pipe material.
Figure 10:
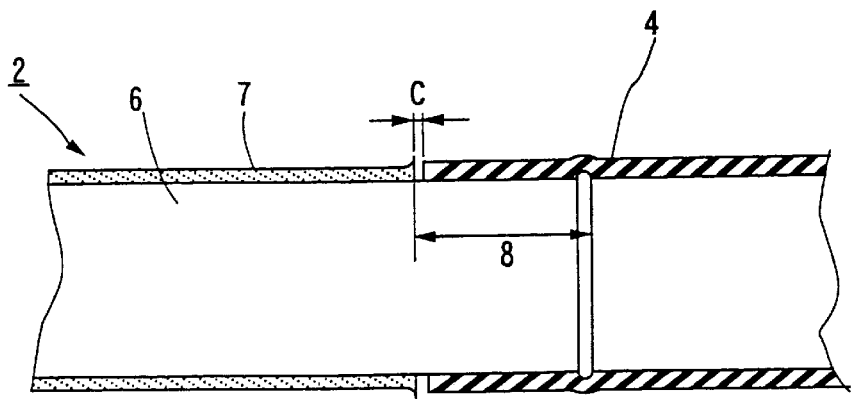
FIG. 10 is a figure showing the problems in prior art.

Preferred embodiments of the present invention will be described below by referring to the drawings. FIGS. 1A to 1C show a first embodiment of the manufacturing method of a resin coating pipe according to the present invention, and they show the process for providing, while forming a resin coating layer on the surface of a fuel filler pipe 2 shown in FIG. 7, an insertion portion 8 where a resin coating layer is not formed, at the end portion of the fuel filler pipe 2.

As a material of the fuel filler pipe 2, similarly to that in prior art, a pipe material 6 in which a surface treatment such as plating or cationic electro deposition coating is performed onto the surface of a cheap steel pipe material with a good processability, is used. Furthermore, at the end portion of the pipe material 6, a slip-off stop portion 10 whose outside diameter is expanded like a ring, has previously been formed.

The masking member 11 for forming an insertion portion 8 by means of masking the peripheral surface near the end portion of the pipe material 6 through a specified length, is formed approximately in a cylindrical shape (like a cup) by using a material such as a heat resistant rubber, as also shown in FIGS. 2A, 2B. In the inside diameter portion of the masking member 11, a mold work portion 12, a press fit portion 13, and a recess portion 14 are formed in order from the entrance side.

The inside diameter of the press fit portion 13 is made to be such a size that the pipe material 6 can lightly be fitted by pressurizing, and the inside diameter of the recess portion 14 is enlarged so that the slip-off stop portion 10 at the end portion of the pipe material 6 may be made free. Furthermore, the mold work portion 12 is formed like a taper whose inside diameter is expanding toward the outside in the axial direction, and the taper angle thereof is set to approximately 30, and depending on the cases, the angle may also be set to a smaller angle or a larger angle.

The length of the insertion portion 8 formed at the end portion of the pipe material 6 is determined by the depth of the masking member 11, that is, the length from the end surface 15 to the bottom surface 16 of the masking member 11. Furthermore, the length in the axial direction of the recess portion 14 must be sufficiently longer than the length of the slip-off stop portion 10 of the pipe material 6, but in a case where the slip-off stop portion 10 is not provided to the pipe material 6, it is possible that the recess portion 14 is omitted and the press fit portion 13 is formed longer by the corresponding length.

In order to form the resin coating layer 7 on the surface of the pipe material 6, first, as a masking step shown in FIG. 1A, the masking member 11 is fitted onto the end portion of the pipe material 6. At this time, the pipe material 6 is not inserted into the innermost portion of the masking member 11, but is stopped at a position a little before the position where the end portion of the pipe material 6 touches the bottom surface 16 of the masking member 11. This position is the initial fit position of the masking member 11.

Furthermore, if the position and the length of the recess portion 14 are previously set so that the position at the time when the slip-off stop portion 10 of the pipe material 6 reaches the step portion between the press fit portion 13 and the recess portion 14 of the masking member 11 by pulling the pipe material 6 after once inserting the pipe material 6 up to the innermost portion of the masking member 11, may be the initial fit position, the deduction of the initial fit position becomes extremely easy and the operating performance is improved.

Next, as a coating step shown in FIG. 1B, onto the rest portion of the surface of the pipe material 6, the resin coating layer 7 is formed. As mentioned above, the resin coating layer 7 is formed by such a process that after the powdered resin material such as polyethylene has been attached electrostatically onto the surface of the pipe material 6, the pipe material 6 is heated so as to melt the resin material, or such a process that after the pipe material 6 has previously been heated, the powdered resin material is sprinkled and attached thereon, and after that, the pipe material 6 is further heated so as to melt the resin material.

Thus, if the resin coating layer 7 is formed by melting the powdered resin material, as a molding step shown in FIG. 1C, the masking member 11 is pressed in the axial direction from the initial fit position toward the portion where the resin coating layer 7 is formed, while the resin coating layer 7 is still hot and soft, so as to slide the masking member 11 until the end portion of the pipe material 6 touches the bottom surface 16 of the masking member 11.

Consequently, the masking member 11 moves from the initial fit position by a distance S, and at the same time, the end portion of the resin coating layer 7 is pressurized by the mold work portion 12 of the masking member 11. Therefore, the end portion of the resin coating layer 7 which is still soft, is formed by pressurizing to be shaped like a taper of the mold work portion 12, and at this portion, the resin connecting portion 17 with a wedge-like cross section whose coating thickness gradually grows thinner toward the end portion of the pipe material 6, is formed. Furthermore, around the basic portion of the resin connecting portion 17, a collar-like and ring-like projection 18 is formed with the resin material pushed away by the masking member 11.

Finally, when the masking member 11 is removed after the resin coating layer 7 has been hardened, the fuel filler pipe 2 as a resin coating pipe is completed. Then, as shown in FIG. 3, the insertion portion 8 of the fuel filler pipe 2 is inserted into the elastic pipe 4 made of a rubber. At that moment, as shown in FIG. 4 on an enlarged scale, the resin connecting portion 17 formed at the end portion of the resin coating layer 7 is fitted by pressurizing into the inside diameter portion of the elastic pipe 4 like a wedge, and the ring-like projection 18 touches the end surface of the elastic pipe 4.

Also, the ring-like projection 18a works as a stopper which prevents the insertion portion 8 from being inserted into the elastic pipe 4 too deep. Therefore, there is no need to form another kind of stopper means on the surface of the pipe material 6, and it simplifies the shape of the pipe material 6.

Thus, when the insertion portion 8 of the fuel filler pipe 2 is inserted into the elastic pipe 4, the resin connecting portion 17 formed at the end portion of the resin coating layer 7 is fitted into the inside diameter portion of the elastic pipe 4 together with the insertion portion 8, and the resin connecting portion 17 overlaps the elastic pipe 4, and therefore, even if the elastic pipe 4 is somewhat shifted in the direction of slipping off from the insertion portion 8 of the fuel filler pipe 2 under the influence of the contraction of the elastic pipe 4 itself, the running vibration of the vehicle, or the like, it does not occur that the insertion portion 8 on which the resin coating layer 7 is not formed, is exposed to the outside, and consequently, the occurrence of corrosion from the insertion portion 8 is completely prevented.

In this first embodiment, the resin connecting portion 17 is formed by sliding the masking member 11 shortly after the heat molding of the resin coating layer 7, to form by pressurizing the end portion of the resin coating layer 7 with the mold work portion 12 of the masking member 11, and therefore, the resin connecting portion 17 can uniformly and easily be formed through the whole circumference of the end portion of resin coating layer 7, and consequetly, the occurrence of corrosion at the insertion portion 8 of the fuel filler pipe 2 can surely be prevented.

By the way, the material of the masking member 11 is not limited to a heat resistant rubber. Another material is also available, if it is a material which has a certain heat resistance and a certain resistance to intermittent periodic duty, and to which the melted resin material cannot easily be adhered. Furthermore, if a grease, a mold-releasing agent, or the like is applied onto the masking member 11, the adhesion of the resin material can effectively be prevented.

Furthermore, even after the resin coating layer 7 has been cooled and hardened after the heat molding of the resin coating layer 7, if such a work that only the end portion of the resin coating layer 7 is heated again to become soft so that the masking member 11 may be fitted and be slided, is performed, the resin connecting portion 17 can be formed by pressurizing, later.

Moreover, in such way that for example, the masking member 11 is formed from a metal with a good heat retaining property, and this metal masking member 11 is heated, and is pressed onto the end portion of the hardened resin coating layer 7, the resin connecting portion 17 can also be formed by pressurizing while the end portion of the resin coating layer 7 is softened by the heat of the masking member 11.

Furthermore, in this first embodiment, the mold work portion 12 of the masking member 11 is formed likme a taper, but it may or may not be formed like a taper. For example, it may be formed like a staircase, making the inside diameter thereof a little larger than that of the press fit portion 13. In that case, when the masking member 11 is slided and the end portion of the resin coating layer 7 is formed by pressurizing, a resin connecting portion 17 whose coating thickness is thinner than that of the resin coating layer 7 and is constant, is formed. Thus, the resin connecting portion 17 should be shaped so that it can fit into (overlap) the inside diameter portion of the elastic pipe 4 together with the insertion portion 8.

Figure 5A:
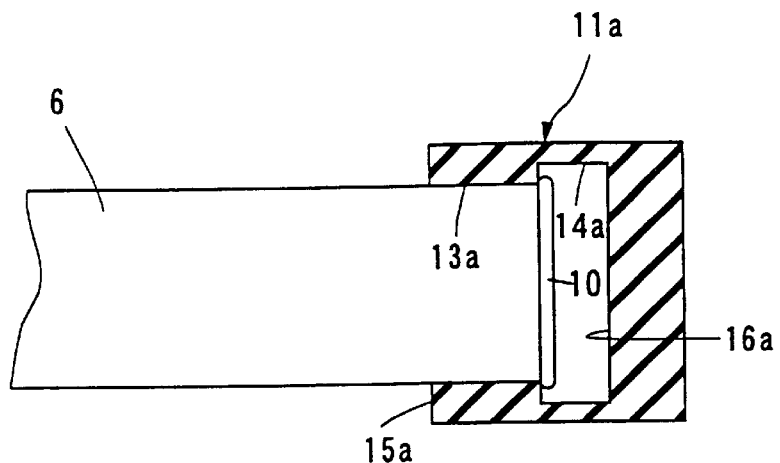
FIGS. 5A to 5C shows a second embodiment of the present invention, and 5A is a figure showing the masking step, 5B is a figure showing the coating step, and 5C is a figure showing the molding step.
Figure 5B:
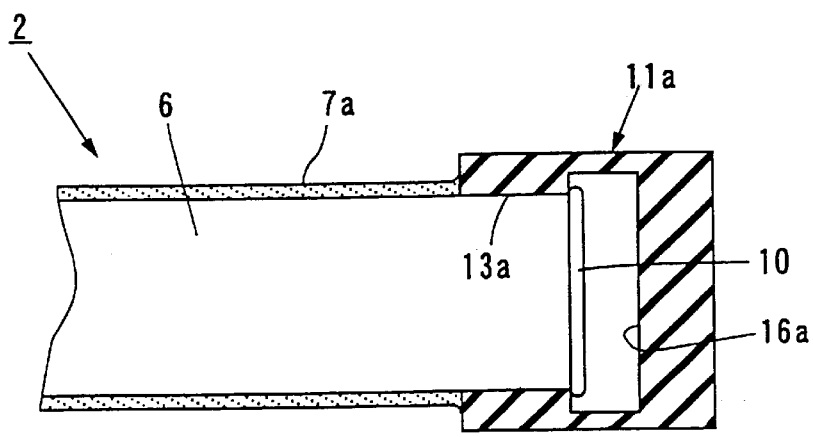
Figure 5C:
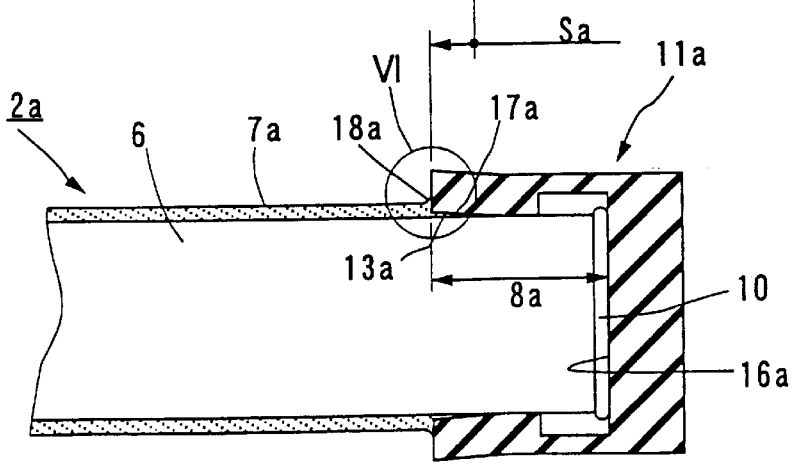

On the other hand, FIGS. 5A to 5C show a second embodiment of the manufacturing method of a resin coating pipe according to the present invention. The pipe material 6 shown in these figures is similar to that of the first embodiment, and the masking member 11a to form the insertion portion 8a by masking the peripheral surface near the end portion of this pipe material 6 through a specified length, is also formed approximately in a cylindrical shape from an elastic material such as a heat resistant rubber similarly to that of the first embodiment. In the inside diameter portion of the masking member 11a, a press fit portion 13a and a recess portion 14a are formed in order from the inlet side, but the mold work portion 12 which is provided in the masking member 11 of the first embodiment, is not formed.

The inside diameter of the press fit portion 13a is made to be such a size that it can lightly be fitted by pressurizing onto the periphery of the pipe material 6, and the inside diameter of the recess portion 14a is enlarged so that the slip-off stop portion 10 at the end portion of the pipe material 6 may be free. In this embodiment, the length of the insertion portion 8a formed at the end portion of the pipe material 6 is also determined by the depth of the masking member 11a, that is, the length from the end surface 15a to the bottom surface 16a of the masking member 11a.

In order to form a resin coating layer 7a on the surface of the pipe material 6, first, as a masking step shown in FIG. 5A, the masking member 11a is fitted onto the end portion of the pipe material 6. At this moment, the pipe material 6 is not inserted up to the innermost portion of the masking member 11a, but is stopped at a position a little before the position where the end portion of the pipe material 6 touches the bottom surface 16a of the masking member 11a. This position is the initial fit position of the masking member 11a.

Next, as a coating step shown in FIG. 5B, onto the rest portion of the surface of the pipe material 6, the resin coating layer 7a is formed by melting similar to that of the first embodiment. Then, if the resin coating layer 7a has been formed, as a molding step shown in FIG. 5C, the masking member 11a is pressed, while the resin coating layer 7a are still hot and soft, in the axial direction from the initial fit position toward the portion where the resin coating layer 7a is formed, and the masking member 11a is slided to a position where the end potion of the pipe material 6 touches the bottom surface 16a of the masking member 11a.

Figure 6:
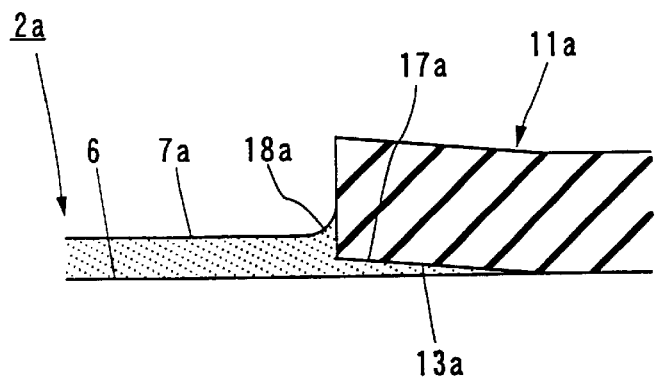
FIG. 6 is an enlarged figure of the portion VI in FIG. 5C.

Consequently, the masking member 11a moves from the initial fit position by a distance Sa, and as shown in FIG. 6 on an enlarged scale, the press fit portion 13a of the masking member 11 runs onto the end portion of the resin coating layer 7a, and therefore, the end portion of the resin coating layer 7a which is still soft, is rolled by the press fit pressure of the press fit potion 13a, and at this portion, the resin connecting portion 17a thinly extending toward the end portion of the pipe material 6, is formed.

The coating thickness of this resin connecting portion 17a grows gradually thinner toward the end potion of the pipe material 6, and around the basic portion of the resin connecting portion 17a, a collar-like and ring-like projection 18a is formed with the resin material pushed away by the masking member 11a. Furthermore, the masking member 11a which can be elastically deformed, is a little enlarged in such a way that the inside and outside diameters thereof run onto the resin connecting portion 17a.

Here, if the inside diameter of the press fit portion 13a of the masking member 11a is too much tight relative to the outside diameter of the pipe material 6, the resin coating layer 7a is completely separated simultaneously with the slide of the masking member 11a. Therefore, it is important to set the inside diameter of the press fit portion 13a of the masking member 11a so that the slided masking member 11a may run onto the resin coating layer 7a to thinly extend the resin coating layer 7a.

Finally, when the masking member 11a is removed after the resin coating layer 7a has been hardened, the fuel filler pipe 2a as a resin coating pipe is completed. Then, the insertion portion 8a of this fuel filler pipe 2a is inserted into the elastic pipe 4 shown in FIG. 7, the resin connecting portion 17a is fitted by pressurizing into the inside diameter portion of the elastic pipe 4 together with the insertion portion 8a to overlap, and the ring-like projection 18a touches the end surface of the elastic pipe 4.

Thus, since the resin connecting portion 17a is fitted by pressurizing into the inside diameter portion of the elastic pipe 4 in a way of overlapping together with the insertion portion 8a of the fuel filler pipe 2a, even if the elastic pipe 4 is somewhat shifted in the direction of slipping off from the insertion portion 8a of the fuel filler pipe 2a under the influence of the contraction of the elastic pipe 4 itself, the running vibration of the vehicle, or the like, it does not occur that the insertion portion 8a on which the resin coating layer 7a is not formed, is exposed to the outside, and consequently, the occurrence of corrosion from the insertion portion 8a is completely prevented.

In this second embodiment, since the resin connecting portion 17a is formed in such a way that the masking member 11a is slided shortly after the heat formation of the resin coating layer 7a, and the end portion of the resin coating layer 7a is thinly extended at the press fit portion 13a of the masking member 11a, the resin connecting portion 17a can thinly, uniformly, and easily be formed through the whole circumference of the end portion of the resin coating layer 7a. In this way, it is unnecessary to provide a mold work portion 12 in the inside diameter portion of the masking member 11a, similar to that provided in the masking member 11 of the first embodiment, and accordingly, the shape of the masking member 11a can be made to be simple.

Furthermore, some patterns are thought out other than that of the first embodiment and that of the above second embodiment to form by pressurizing the resin connecting portion at the end portion of the resin coating layer. In short, the point of the present invention is that by sliding the masking member in the axial direction of the pipe material 6, the end portion of the resin coating layer is molded by pressuring with the masking member, and the resin connecting portion which can be fitted into the inside diameter portion of another fitting member together with the insertion portion, is formed at the end portion of the resin coating layer.

Also, according to the fuel tank 1 equipping a resin coating pipe described in the first embodiment and the second embodiment as its fuel filler pipe 2a, since the resin coating pipe with a high corrosion resistance at the pipe connecting portion (8 or 8a) is applied as a fuel filler pipe, the durability and the reliability of the whole fuel tank 1 are greatly improved.

What is claimed is:

1. A resin coating pipe, wherein a peripheral surface near an end portion of a pipe material is masked through a specified length, a slip-off stop portion is provided at the end portion of the pipe material, and a resin coating layer is formed on an unmasked portion of a surface of the pipe material, and the masked portion is made to be an insertion portion to be inserted liquid tight into an inside diameter portion of another fitting member, wherein a resin connecting portion is formed at an end portion of said resin coating layer, said resin connecting portion is shaped so as to be extending along the insertion portion, said resin connecting portion having a wedge-shaped cross section with a coating thickness that gradually grows thinner toward the end portion of the pipe material, and a total coating thickness of the resin connecting portion is made thinner than a thickness of the resin coating layer, the resin connecting portion is configured to be inserted into the inside diameter portion of said another fitting member together with the insertion portion and the slip-off stop portion, a ring-shaped projection is formed between the resin coating layer and the resin connecting portion, an end surface of said ring-shaped projection extends in a direction perpendicular to an axis of the pipe material, whereby said ring-shaped projection serves as a stopper for said another fitting member which is connected onto the insertion portion and the resin connecting portion.

* * * * *